United States Patent
Peinado et al.

(10) Patent No.: US 12,163,471 B2
(45) Date of Patent: Dec. 10, 2024

(54) FUEL SYSTEM AND METHOD FOR SUPPLYING A COMBUSTION CHAMBER IN AN AIRCRAFT TURBOSHAFT ENGINE WITH FUEL

(71) Applicant: SAFRAN AIRCRAFT ENGINES, Paris (FR)

(72) Inventors: Jérémy Peinado, Moissy-Cramayel (FR); David Pascal Smagghe, Moissy-Cramayel (FR); Joseph Jean Marie Burguburu, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/261,185

(22) PCT Filed: Jan. 7, 2022

(86) PCT No.: PCT/EP2022/050233
§ 371 (c)(1),
(2) Date: Jul. 12, 2023

(87) PCT Pub. No.: WO2022/152621
PCT Pub. Date: Jul. 21, 2022

(65) Prior Publication Data
US 2024/0318601 A1 Sep. 26, 2024

(30) Foreign Application Priority Data
Jan. 14, 2021 (FR) .................................. 2100352

(51) Int. Cl.
*F02C 7/232* (2006.01)
*F02C 7/22* (2006.01)
(Continued)

(52) U.S. Cl.
CPC .............. *F02C 7/232* (2013.01); *F02C 7/228* (2013.01); *F02C 9/263* (2013.01); *F23R 3/346* (2013.01); *F02C 7/22* (2013.01); *F23R 3/28* (2013.01)

(58) Field of Classification Search
CPC .. F02C 7/22; F02C 7/228; F02C 7/232; F02C 9/263; F23R 3/346
See application file for complete search history.

(56) References Cited

U.S. PATENT DOCUMENTS 5,881,550 A 3/1999 Toelle
8,573,245 B1 * 11/2013 Jansen .................... F02C 7/232
137/240

(Continued)

FOREIGN PATENT DOCUMENTS

EP 2026002 A1 2/2009
EP 3211200 A1 8/2017

OTHER PUBLICATIONS

International Search Report from Corresponding International Application No. PCT/EP2022/050233, dated Feb. 11, 2022, 2 pages.

*Primary Examiner* — William H Rodriguez
(74) *Attorney, Agent, or Firm* — RANKIN, HILL & CLARK LLP (57) ABSTRACT

A system for supplying the combustion chamber in an aircraft turboshaft engine with fuel, comprising injectors comprising a first pilot stage, a second pilot stage, and a main stage. The pilot stages being configured to deliver a permanent flow rate of fuel and the main stage being configured to deliver an intermittent flow rate of fuel. A device for distributing fuel into the injectors comprising a primary circuit, a secondary circuit, and a valve configured to distribute the fuel between the primary circuit and the secondary circuit. The primary circuit being connected to the (Continued)

first pilot stage and the main stage, the secondary circuit being connected to the second pilot stage, and a member for controlling the valve.

20 Claims, 6 Drawing Sheets

(51) Int. Cl.
*F02C 7/228* (2006.01)
*F02C 9/26* (2006.01)
*F23R 3/34* (2006.01)
*F23R 3/28* (2006.01)

(56) References Cited

U.S. PATENT DOCUMENTS

| | | | |
|---|---|---|---|
| 12,018,841 B1* | 6/2024 | Madden | F23R 3/28 |
| 2009/0320777 A1* | 12/2009 | Rawlinson | F02C 7/222 |
| | | | 123/90.12 |
| 2013/0291547 A1* | 11/2013 | Ochiai | F02C 7/00 |
| | | | 60/722 |
| 2014/0123651 A1* | 5/2014 | Smith | F02C 9/34 |
| | | | 60/737 |
| 2015/0369489 A1 | 12/2015 | Badet et al. | |
| 2018/0163630 A1* | 6/2018 | Bickley | F23K 5/06 |
| 2018/0163636 A1* | 6/2018 | Griffiths | F02C 7/222 |
| 2018/0163966 A1* | 6/2018 | Jones | F02C 7/222 |
| 2021/0277834 A1* | 9/2021 | Culwick | F02C 7/222 |
| 2024/0210037 A1* | 6/2024 | Madden | F02C 7/228 |
| 2024/0210038 A1* | 6/2024 | Madden | F02C 7/224 |

* cited by examiner

FUEL SYSTEM AND METHOD FOR SUPPLYING A COMBUSTION CHAMBER IN AN AIRCRAFT TURBOSHAFT ENGINE WITH FUEL

TECHNICAL FIELD

The present invention relates to the field of supplying a combustion chamber in an aircraft turboshaft engine with fuel.

Figure 1:
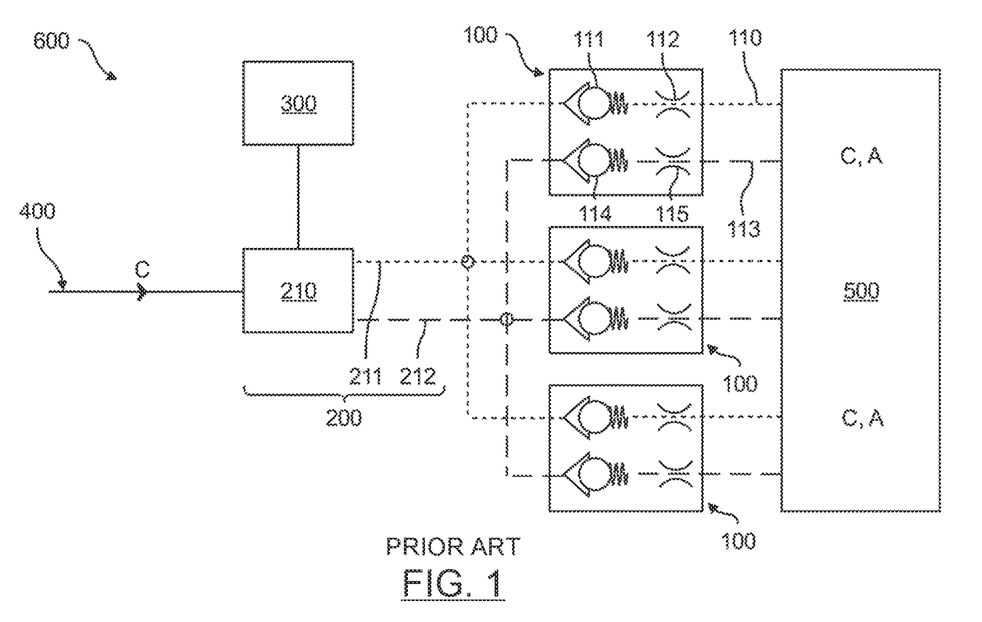
FIG. 1 is a schematic representation of the fuel supply system of the combustion chamber in an aircraft turboshaft engine according to prior art.

In a known manner, with reference to FIG. 1, an aircraft comprises one or more turboshaft engines 600 each comprising a combustion chamber 500 in which air A and fuel C configured to react together according to a combustion reaction enter, so as to release energy necessary for the thrust of the aircraft. Air A comes from outside of the turboshaft engine 600 and is guided to the combustion chamber 500 by an air stream (not represented) while fuel C comes from a fuel circuit 400 opening into the combustion chamber 500.

The fuel system 400 comprises a set of injectors 100 configured to spray the fuel C as droplets into the combustion chamber 500 as well as a device for distributing the fuel C 200 into the injectors 100 controlled by a control member 300. Upstream, the fuel circuit 400 conventionally comprises the following elements (not represented), cited in the flow direction of fuel C from upstream to downstream: a storage tank, a low-pressure pump, a filtering member, a high-pressure pump and a device for metering fuel C to be injected into the combustion chamber 500, usually called FMU ("Fuel Metering Unit").

Still with reference to FIG. 1, a so-called "two-stage" injector 100 is known, comprising, on the one hand, a pilot stage 110 configured to deliver a permanent flow rate of fuel C optimized for the low and medium speeds of the turboshaft engine 600, and, on the other hand, a main stage 113 configured to deliver an intermittent flow rate of fuel C only for the high speeds of the turboshaft engine 600. The pilot stage 110 comprises a seal valve 111, configured to circulate the fuel C as soon as a sufficient pressure of fuel C in the circuit is reached, as well as a nozzle 112 configured to generate spray of fuel C in the center of the combustion chamber 500. The nozzle 112 is of the aerodynamic injection type, that is the fuel-air mixture forming the spray is generated by shearing the fuel C between two air swirls. Still with reference to FIG. 1, the main stage 113 comprises a multipoint valve 114 and a multipoint nozzle 115 comprising a set of peripheral injection points located around the nozzle 112 of the pilot stage 110.

In a known manner, still with reference to FIG. 1, the distribution device 200 comprises a pilot circuit 211 and a main circuit 212 supplying the pilot stage 110 and the main stage 113 of each injector 100 with fuel C respectively. The distribution device 200 further comprises a distribution valve 210 to distribute the fuel C between the pilot circuit 211 and the main circuit 212.

Such two-stage injectors 100 and a dual-circuit distribution device 200 advantageously form a fuel supply system enabling the combustion reaction to be optimized for any speed of the turboshaft engine 600, generating the expected thrust for the aircraft while limiting rejection of burnt gases. However, in the event of failure of the distribution valve 210 or the control member 300, the entire fuel C is likely to be directed into a single circuit 211, 212. If it is pilot circuit 211, this can lead to an undesirable loss of thrust of the turboshaft engine 600. If it is the main circuit 212, this can impair operation of the turboshaft engine 600 and possibly lead to an engine stop.

An immediate solution to avoid this drawback would be to be redundant and increase the safety of the distribution valve 210 and the control member 300, in order to prevent any risk of failure. However, a modification to the distribution valve 210 or the control member 300 is complex and would require a significant increase in overall size and mass.

In addition to the aforementioned drawback, at low speeds of the turboshaft engine 600, the entire fuel C is directed to the pilot circuit 211, which promotes the risk of coking (solidification by gum formation) of the residual fuel C in the main circuit 212 and in the main stage 113 of the injectors 100. In addition, for high speeds, the introduction of a high flow rate of fuel C into the main stage 113 of the injectors is likely to lead to combustion instability in the combustion chamber 500. Supply systems according to prior art are known from documents US20150369489A1 and EP3211200A1.

The invention thus provides a system and method for supplying the combustion chamber with fuel making it possible to eliminate at least some of the drawbacks stated.

SUMMARY

The invention relates to a system for supplying a combustion chamber in an aircraft turboshaft engine with fuel, said system comprising:

a plurality of injectors configured to inject fuel into the combustion chamber, each injector being in the form of a three-stage injector comprising a first pilot stage, a second pilot stage and a main stage, the first pilot stage and the second pilot stage respectively comprising a first pilot valve and a second pilot valve, each configured to circulate a permanent flow rate of fuel, the main stage comprising a main valve configured to circulate an intermittent flow rate of fuel, so as to adapt supply to the combustion chamber according to the speed of the aircraft turboshaft engine, a device for distributing fuel in the injectors in the form of a dual-circuit distribution device comprising a primary circuit and a secondary circuit, the primary circuit being connected to the first pilot stage and the main stage, the secondary circuit being connected to the second pilot stage, the distribution device comprising a distribution valve configured to distribute fuel between the primary circuit and the secondary circuit, and a member for controlling the distribution valve according to the speed of the aircraft turboshaft engine.

By virtue of the three-stage architecture of the injectors and the dual-circuit architecture of the distribution device, the supply system according to the invention advantageously has increased safety in the event of failure of the control member and/or the distribution valve, which can lead to blocking of the distribution valve in an uncontrolled distribution position. Indeed, even if the blocking position corresponds to either of both end positions of the valve, which implies that only the primary circuit or the secondary circuit is supplied, a pilot stage is systematically supplied. Thus, in the event that all of the fuel is guided into the primary circuit, this would result in acceptable degraded operation which would not significantly reduce the performance of the aircraft turboshaft engine. However, there is a risk of instabilities in combustion and fuel coking in the secondary circuit due to the fuel no longer circulating therein, such risks cannot lead to an uncontrolled engine stop and only have an impact during injector maintenance. In the opposite possibility where all the fuel would be guided to the secondary circuit, the aircraft turboshaft engine would operate with a small loss of thrust, especially if the secondary circuit permeability is relatively high allowing a large injected flow rate to pass through. Here, too, this operation cannot lead to an uncontrolled engine stop. Thus, in the event of a failure on the position of the distribution valve, the supply system of the invention makes it possible to limit the effects thereof, restricted to a moderate loss of performance.

Furthermore, the invention advantageously makes it possible to avoid both the risk of coking and the risk of combustion instabilities during normal operation of the distribution valve. Indeed, it is possible during operation to control the distribution valve in an adapted position to continuously circulate fuel in the primary circuit and secondary circuit as soon as the fuel flow rate entering the valve exceeds relatively low values, thus preventing fuel coking. In addition, the three-stage architecture of the injectors allows the fuel pressure in each stage to be reduced compared to prior art, and in particular in the main stage, because part of the fuel flow rate is distributed in the secondary circuit.

According to one aspect of the invention, the first pilot stage, the second pilot stage and the main stage respectively comprise a first pilot nozzle supplied by the first pilot valve, a second pilot nozzle supplied by the second pilot valve and a main nozzle supplied by the main valve. The injection nozzles advantageously make it possible inject fuel into the combustion chamber.

Preferably, the second pilot nozzle comprises a permeability greater than a permeability of the first pilot nozzle, so as to deliver a flow rate adapted for ignition of the aircraft turboshaft engine. It is stated that the permeability of a nozzle corresponds to the maximum fuel flow rate that it can inject into the combustion chamber. Advantageously, the low permeability of the first pilot nozzle thus enables a relatively low fuel flow adapted for ignition of the combustion chamber to be delivered upon starting the aircraft turboshaft engine. In addition, as the second pilot nozzle makes it possible to inject more fuel than the first pilot nozzle, more fuel circulates into the secondary line than into the primary line, preventing the main valve from opening unintentionally. This also avoids the need to increase the cracking pressure of the main valve and therefore the pressure in the primary line.

Preferably, the second pilot nozzle has a permeability less than a permeability of the main nozzle, to ensure the passage of high fuel flow rates at high speeds of the aircraft turboshaft engine.

According to one aspect of the invention, the first pilot nozzle is of the aerodynamic injection type and is configured to inject fuel spray into the combustion chamber. Such a first pilot nozzle is advantageously configured to form the air-fuel mixture by shearing the fuel between two air swirls. Preferably, the first pilot nozzle is positioned in the center of each injector, in order to ensure permanent supply of fuel into the combustion chamber.

According to one aspect of the invention, the second pilot nozzle is of the aeromechanical injection type and configured to inject fuel spray into the combustion chamber. Preferably, the second pilot nozzle is positioned peripherally in each injector, preferably around the first pilot nozzle. Such a nozzle advantageously makes it possible to pressurize the fuel to inject it as a spray. Preferably, the second pilot nozzle forms a ring around the first pilot nozzle, so as to extend concentrically. Together, the two pilot nozzles thus ensure that fuel is permanently injected into the combustion chamber, which is sufficient at low and medium speeds.

According to one aspect of the invention, the main nozzle is in the form of a multipoint nozzle comprising a plurality of injection points, said injection points preferably being positioned peripherally in each injector, preferably around the first pilot nozzle. Advantageously, the main nozzle is configured to inject fuel as an auxiliary to the two pilot nozzles at high speeds of the aircraft turboshaft engine.

According to one aspect of the invention, the first pilot valve is a seal valve, preferably free of a metering function. Such a first pilot valve advantageously makes it possible to simply ensure sealing of the first pilot stage when the engine is stopped or before the combustion chamber is ignited.

According to one preferred aspect, the second pilot valve is a seal valve, preferably free of a metering function. Such a second pilot valve advantageously makes it possible to simply ensure sealing of the second pilot stage when the engine is stopped or before the combustion chamber is ignited.

According to another preferred aspect, the main valve is a multi-point valve. Such a main valve advantageously makes it possible to ensure supply to each of the injection points of the main nozzle.

According to one aspect of the invention, the main valve comprises a cracking pressure greater than a cracking pressure of the first pilot valve, so as to deliver a fuel flow rate only above a predetermined pressure in the main stage corresponding to high fuel flow rates, that is at a high or alternatively medium turboshaft engine speed with acceleration. Thus, although the main valve and the first pilot valve are connected to the same primary line, only the first pilot valve is configured to allow fuel to pass therethrough when the primary line pressure is lower than the predetermined cracking pressure of the main valve. This enables injection to be limited to the two pilot valves for low speeds of the aircraft turboshaft engine.

It is stated that the cracking pressure of a valve corresponds to the minimum fuel pressure in the stage from which the valve is configured to open and allow fuel to pass therethrough. In the case of a spring-loaded valve, for example, a spring is provided to hold a ball against a sealing seat, the cracking pressure of the spring being a function of its spring constant and the compression of the spring in the facility.

According to one aspect of the invention, the first pilot valve comprises a cracking pressure substantially equal to a cracking pressure of the second pilot valve, so as to ensure sealing of the fuel of the first pilot stage and the second pilot stage when the engine is stopped or in the starting phases before ignition of the combustion chamber. It is set out that the term "significantly" means that there is a deviation by at most 10% between both cracking pressure values.

According to another aspect of the invention, the second pilot valve is a metering valve and the second pilot stage comprises a seal valve. Preferably, said second pilot valve is positioned downstream of the seal valve of the second pilot stage. Preferably also, said second pilot valve has a cracking pressure greater than a cracking pressure of the seal valve of the second pilot stage. Preferably, the seal valve of the second pilot stage has a cracking pressure substantially equal to that of the first pilot valve. The combined use of a seal valve and a metering valve allows a low pressure to be maintained in the second pilot stage while controlling the flow rate of fuel passing through the metering valve.

According to one aspect, the second pilot stage comprises an anti-coking conduit opening, on the one hand, between the second pilot valve and the seal valve of the second pilot stage, and, on the other hand, upstream of the supply system, so as to allow fuel to circulate via the seal valve when the second pilot valve is closed. The use of an anti-coking conduit allows the circulation of fuel even at low pressure, with the seal valve open but the metering valve, i.e. the second pilot valve is closed.

The invention also relates to a fuel circuit of an aircraft turboshaft engine comprising a supply system as described previously, the fuel circuit being configured to supply the distribution device with fuel.

The invention also relates to the assembly of a fuel system as described previously and a combustion chamber of an aircraft turboshaft engine, the injectors of the supply system opening into the combustion chamber so as to supply it with fuel.

The invention also relates to the assembly of a combustion chamber and a fuel circuit of an aircraft turboshaft engine, the fuel circuit comprising a supply system as described previously and being configured to supply the distribution device with fuel, the injectors of the fuel system opening into the combustion chamber so as to supply it with fuel.

The invention further relates to an aircraft turboshaft engine comprising a combustion chamber and a supply system as described previously, the injectors of the supply system opening into the combustion chamber so as to supply it with fuel.

The invention further relates to an aircraft turboshaft engine comprising a combustion chamber and a fuel circuit comprising a supply system as described previously, the fuel circuit being configured to supply the distribution device with fuel, the injectors of the fuel system opening into the combustion chamber so as to supply it with fuel.

The invention further relates to an aircraft comprising at least one turboshaft engine as described previously.

The invention additionally relates to a method for supplying a combustion chamber in an aircraft turboshaft engine with fuel by means of the supply system as described previously, the method comprising:
- a step of controlling the distribution valve according to the speed of the aircraft turboshaft engine, by means of the control member,
- a step of distributing the fuel between the primary circuit and the secondary circuit, by means of the distribution valve and
- a step of injecting fuel into the combustion chamber by means of the injectors,
- in which method, for any speed of the aircraft turboshaft engine, once the turboshaft engine is started, the distribution valve guides fuel into both the primary circuit and the secondary circuit during the distribution step.

Advantageously, such a supply method is effective for any operating speed of the aircraft turboshaft engine by virtue of a three-stage injector architecture and enhances safety in the event of failure by virtue of its dual-circuit architecture each connected to a pilot stage. Such a method especially enables the risk of fuel coking to be reduced, for example, as both circuits are permanently supplied with fuel.

DESCRIPTION OF THE DRAWINGS

The invention will be better understood upon reading the following description, given as an example, and by referring to the following figures, given as non-limiting examples, wherein identical references are given to similar objects.

It should be noted that the figures set out the invention in detail in order to implement the invention, said figures may of course be used to better define the invention if necessary.

DETAILED DESCRIPTION

Figure 2:
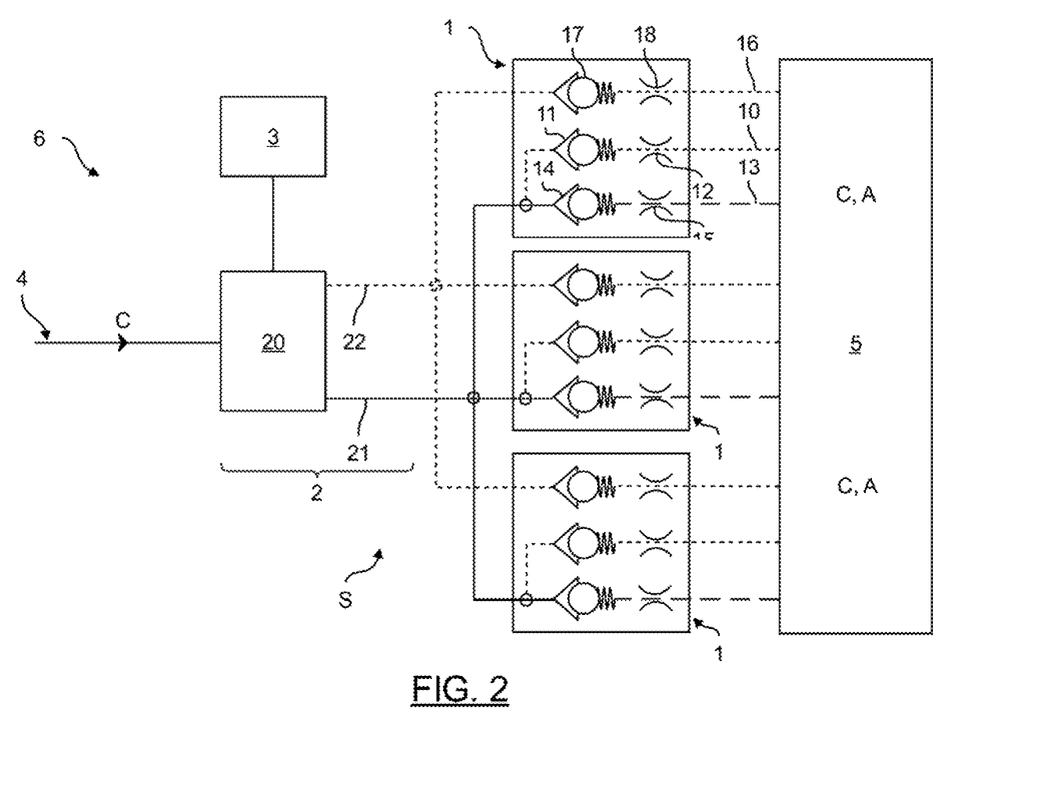
FIG. 2 is a schematic representation of the fuel supply system of the combustion chamber in an aircraft turboshaft engine according to one embodiment of the invention.

With reference to FIG. 2, the invention relates to an aircraft which comprises one or more turboshaft engines 6 each comprising a combustion chamber 5 in which air An and fuel C enter configured to react together following a combustion reaction, so as to release the energy necessary for the thrust of the aircraft. Air A comes from outside of the turboshaft engine 6 and is guided to the combustion chamber 5 by an air stream (not shown) while fuel C comes from a fuel circuit 4 opening into the combustion chamber 5. The fuel circuit 4 comprises the following components (not represented) listed in the flow direction of fuel C from upstream to downstream: a storage tank, a low-pressure pump, a filtering member, a high-pressure pump and a fuel device for metering fuel C to be injected into combustion chamber 5, usually referred to as FMU ("Fuel Metering Unit").

Still with reference to FIG. 2 and according to the invention, the fuel circuit 4 also comprises, downstream, a fuel supply system S C of the combustion chamber 5 which comprises:
- injectors 1 opening into the combustion chamber 5,
- a device for distributing 2 fuel C in the injectors 1 and
- a member for controlling 3 the distribution device 2.

According to the invention, as illustrated in FIG. 2, each injector 1 comprises three stages, i.e., a first pilot stage 10, a second pilot stage 16, and a main stage 13. The first pilot stage 10 and the second pilot stage 16 respectively comprise a first pilot valve 11 and a second pilot valve 17 each configured to circulate a permanent flow rate of fuel C. The main stage 13 in turn comprises a main valve 14 configured to circulate an intermittent flow rate of fuel C, so as to adapt supply to the combustion chamber 5 according to the speed of the aircraft turboshaft engine 6. In practice, the first pilot valve 11 and the second pilot valve 17 are adapted to open when the turboshaft engine 6 is ignited, that is from a low pressure of fuel C in the fuel circuit 4. The main valve 14 is in turn adapted to open from a relatively high pressure of fuel C in the fuel circuit 4, corresponding to a high speed of the aircraft turboshaft engine 6 or alternatively a medium speed with acceleration.

With reference to FIG. 2, the first pilot stage 10, the second pilot stage 16 and the main stage 13 further comprise respectively a first pilot nozzle 12, a second pilot nozzle 18 and a main nozzle 15. Each nozzle 12, 15, 18 is fitted downstream of the valve 11, 14, 17 associated in relation to the flow direction of fuel C in the supply system S. Each nozzle 12, 15, 18 is configured to inject fuel C having passed through the valve 11, 14, 17 associated into the combustion chamber 5.

Still according to the invention and with reference to FIG. 2, the distribution device 2 comprises two circuits, i.e. a primary circuit 21 connected to the first pilot stage 10 and to the main stage 13 as well as a secondary circuit 22 connected to the second pilot stage 16. The distribution device 2 further comprises a distribution valve 20 configured to distribute the fuel C between the primary circuit 21 and the secondary circuit 22. The control member 3 is in turn connected to the distribution device 2 and configured to control movement of the distribution valve 20 as a function of the speed of the aircraft turboshaft engine 6 so as to adapt supply of fuel C to the combustion chamber 5.

Advantageously, the control member 3 and the distribution device 2 are analogous to prior art, which enables the advantages of the invention to be enjoyed by simply adapting a supply system according to prior art.

In the example of FIG. 2, only three injectors 1 are shown for the sake of clarity and brevity, but it goes without saying that the number of injectors 1 is any number, preferably greater than ten and less than thirty. The distribution device 2 is in turn preferably unique, as is the control member 3.

Furthermore, within the scope of the invention, each injector 1 comprises only three stages 10, 13, 16 and the distribution device 2 comprises only two circuits 21, 22. The primary circuit 21 and the secondary circuit 22 are connected to each injector 1. Each circuit 21, 22 is divided at a node into several conveying pathways each connected to a given injector 1. In the example in FIG. 2, the primary circuit 21 and the secondary circuit 22 are thus each divided into three conveying pathways, the number of conveying pathways being equal to the number of injectors 1. The conveying pathways are preferably identical so as to distribute fuel C equally between the different injectors 1. Thus, in a similar way to prior art, each injector 1 is connected to a primary circuit 21 and a secondary circuit 22.

Figure 3A:
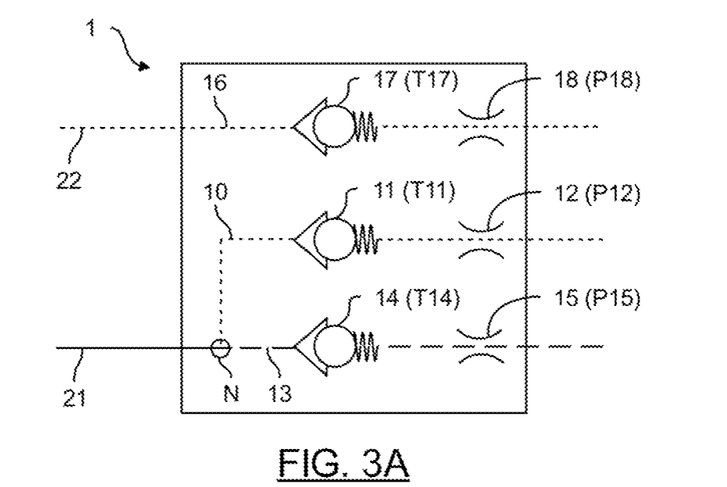
FIG. 3A is a schematic representation of an injector of the supply system in FIG. 2.

With reference to FIG. 3A and as previously described, each injector 1 comprises three valves 11, 14, 17, namely two pilot valves 11, 17 for permanently injecting fuel C and a main valve 14 for intermittently injecting fuel C. More precisely, the main valve 14 is configured to open in a complementary manner to the pilot valves 11, 17, in order to ensure sufficient supply of fuel C at high engine speeds of the aircraft turboshaft engine 6. The pilot valves 11, 17 in turn together provide sufficient supply of fuel C for low speeds of the aircraft turboshaft engine 6. The presence of two pilot valves 11, 17 instead of a single one in prior art also makes it possible to ensure flame stability at high speeds.

Still with reference to FIG. 3A, the first pilot valve 11 and the second pilot valve 17 are supplied separately with fuel C, that is respectively from the primary circuit 21 and the secondary circuit 22. In the event of failure of the distribution valve 20 or the control member 3 leading all the fuel C into either of the two circuits 21 or 22, this limits consequences to a non-significant loss of thrust. Indeed, no matter which circuit 21, 22 the entire fuel C is sent, it is directed into one of the pilot valves 11, 17, which eliminates the risk of engine stoppage.

As illustrated in FIG. 3A, the primary circuit 21 supplies both the first pilot valve 11 and the main valve 14, dividing into two pathways at an internal node N at each injector 1, one of the pathways corresponding to the first pilot stage 10, the other to the main stage 13. This limits the number of circuits 21, 22 of the distribution device 2 to two. In addition, this avoids any risk of coking of fuel C in the circuits 21 and 22 because they permanently supply the pilot valves 11, 17.

Preferably, the first pilot valve 11 is in the form of a seal valve, configured to ensure sealing of the first pilot stage 10 when the turboshaft engine 6 is stopped or before the combustion chamber 5 is ignited. According to a preferred aspect, the second pilot valve 17 is also in the form of a seal valve for the same reasons. Preferably, the main valve 14 is in turn in the form of a multipoint valve configured to supply all the injection points of the main nozzle 15 as will be described below.

With reference to FIG. 3A, each of the valves 11, 14, 17 has a cracking pressure T11, T14, T17 which corresponds to the minimum pressure of fuel C in the stage 10, 13, 16 from which the valve 11, 14, 17 is configured to inject it into the combustion chamber 5. Preferably, the cracking pressure T14 of the main valve 14 is greater than the cracking pressure T11 of the first pilot valve 11. This allows the fuel C delivered by the main valve 14 and the first pilot valve 11 to be managed independently, although they are both supplied by the primary circuit 21. In practice, below a predetermined pressure in the primary circuit 21, namely for low speeds of the aircraft turboshaft engine, only the first pilot valve 11 circulates fuel C. Above said predetermined pressure, namely for high speeds of the aircraft turboshaft engine, the first pilot valve 11 and the main valve 14 both allow fuel C to circulate. Preferably, the predetermined pressure is greater than 2 bar and less than 4 bar. In the previous example of two pilot valves 11, 17 of the same type, the cracking pressure T11, T17 of the pilot valves 11, 17 is substantially equal and low, so as to permanently deliver fuel C to the combustion chamber 5, especially when the pressure in the primary circuit 21 and the secondary circuit 22 is low. Alternatively, the second pilot valve 17 could be in a form other than a seal valve, such as a metering valve configured to meter fuel C according to the pressure in the fuel circuit 4 and associated with a seal valve as will be seen later.

Figure 3B:
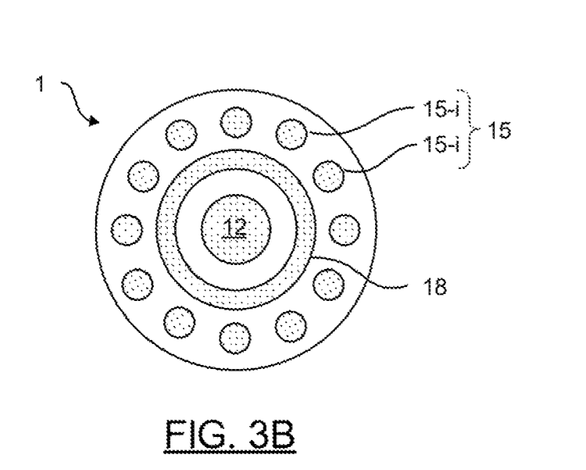
FIG. 3B is a schematic representation of the injector nozzles of FIG. 3A.

Preferably, the first pilot nozzle 12 is of the aerodynamic injection type, that is it is configured to generate spray of fuel C by shearing the fuel C between two air swirls. Preferably also, the second pilot nozzle 18 is of the aeromechanical injection type, that is it is configured to generate spray by pressurizing the fuel C. The first pilot nozzle 12 and the second pilot nozzle 18 thus have a different structure, which ensures proper combustion throughout their entire operating range (from low to medium speeds). In the example of FIG. 3B, the first pilot nozzle 12 is positioned in the center of the injector 1. The second pilot nozzle 18 is in turn positioned peripherally to the first pilot nozzle 12 and in this example is in the form of a ring concentric to the first pilot nozzle 12. The spray generated by the second pilot nozzle 18 thus enables that of the first pilot nozzle 12 to be completed.

Still with reference to FIG. 3B, the main nozzle 15 preferably comprises a set of injection points 15-$i$ of fuel C. In the example of FIG. 3B, the injection points 15-$i$ of the main nozzle 15 are positioned peripherally on each injector 1. In this example, the injection points 15-*i* are distributed in a ring concentric to the pilot nozzles 12, 18 and extending outwardly therefrom.

With reference to FIG. 3A, each of the nozzles 12, 15, 18 has a permeability P12, P15, P18 which corresponds to the maximum flow rate of fuel C that can be injected through the nozzle 12, 15, 18. Preferably, the permeability P12 of the first pilot nozzle 12 is less than the permeability P18 of the second pilot nozzle 18, which means that the permeability of the first pilot stage 10 is less than the permeability of the second pilot stage 16, so as to be able to inject a low flow rate when the aircraft turboshaft engine 6 is ignited. This also allows, at low speeds, fuel C to be injected mainly from the second pilot stage 16 and thus to limit pressure in the primary circuit 21 to avoid any opening of the main valve 14. Preferably also, the permeability P15 of the main nozzle 15 is the greatest, so as to be able to deliver a high flow rate of fuel C for high speeds of the aircraft turboshaft engine 6.

To summarize, the supply system S of the invention has enhanced safety by virtue of three-stage injectors, comprising two pilot stages 10, 16 and a main stage 13, as well as a dual-circuit device for distributing 2 the fuel C. Indeed, the pilot stages 10, 16 ensure flame stability at high speeds of the aircraft turboshaft engine 6 and are supplied separately to ensure acceptable degraded mode in the event of a failure in distribution of fuel C. The first pilot stage 10 and the main stage 13 are in turn supplied by the same primary circuit 21 to avoid any risk of coking. A fuel system according to prior art can thus be transformed into the system S of the invention by simply modifying the injectors 1.

A method for supplying the combustion chamber 5 by means of the above-mentioned supply system S is described below.

Figure 4:
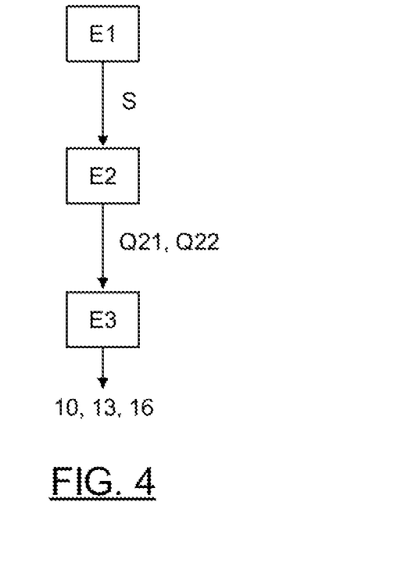
FIG. 4 is a schematic representation of the method for supplying the combustion chamber in an aircraft turboshaft engine with fuel according to one embodiment of the invention.

With reference to FIG. 4 and according to the invention, the method begins with a control step E1, during which the control member 3 transmits a control signal S to the distribution valve 20 which is a function of the speed of the aircraft turboshaft engine 6. In other words, the control member 3 controls position of the distribution valve 20 and adapts it mainly according to the speed of the aircraft turboshaft engine 6.

As illustrated in FIG. 4, once the distribution valve 20 is positioned, the method then comprises a step of distributing E2 the fuel C between the primary circuit 21 and the secondary circuit 22. In practice, regardless of the speed of the aircraft turboshaft engine 6, outside the ignition period and in the absence of a failure, the distribution valve 20 guides fuel C both into the primary circuit 21 and the secondary circuit 22 so that the pilot valves 11, 17 can permanently supply the combustion chamber 5. In other words, the position of the distribution valve 20 regulates the relative proportion Q21, Q22 of fuel C transmitted to the primary circuit 21 and the secondary circuit 22.

Still with reference to FIG. 4, once fuel C is distributed between the primary circuit 21 and the secondary circuit 22, the method comprises an injection step E3, during which each injector 1 delivers fuel C into the combustion chamber 5. More precisely, the injection step E3 is implemented by the pilot nozzles 12, 18 in addition or not to the main nozzle 15 depending on the speed of the aircraft turboshaft engine 6.

Figure 5A:
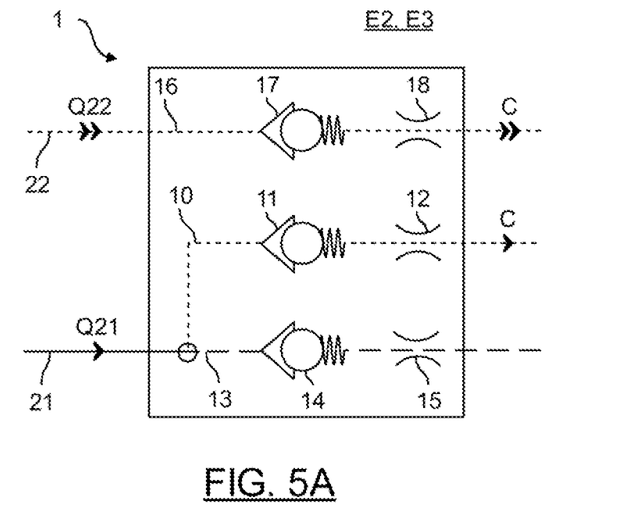
FIG. 5A is a schematic representation of the steps of distributing and injecting fuel into an injector of the method of FIG. 4, when the speed of the aircraft turboshaft engine is low.

In the example of FIG. 5A illustrating the method of supplying the invention in the case of a low speed of the aircraft turboshaft engine 6, the distribution valve 20 is positioned so as to distribute E2 the fuel C in greater proportion Q22 in the secondary circuit 22 and in smaller proportion Q21 in the primary circuit 21. Due to their small cracking pressures T11, T17, only pilot valves 11, 17 are open to allow pilot nozzles 12, 18 to inject E3 fuel C into the combustion chamber 5. In other words, the pressure in primary circuit 21 and secondary circuit 22 is lower than the predetermined cracking pressure T14 of the main valve 14. Furthermore, the injection step E3 is mainly implemented by the second pilot nozzle 18, which has a greater permeability P18 than the first pilot nozzle 12.

Figure 5B:
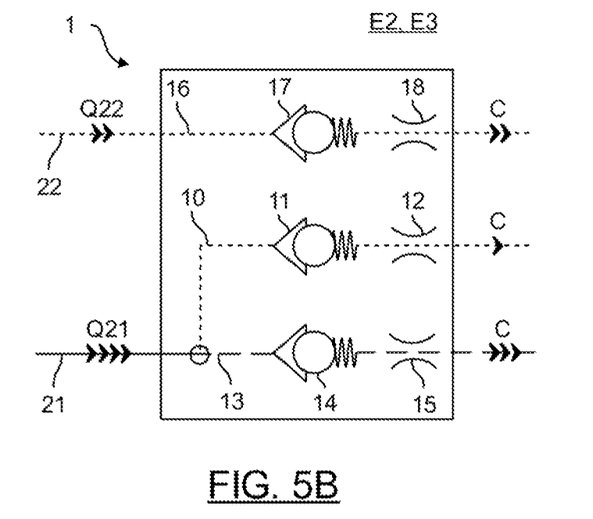
FIG. 5B is a schematic representation of the steps of distributing and injecting fuel into an injector of the method of FIG. 4, when the speed of the aircraft turboshaft engine is high.

In the example of FIG. 5B illustrating the supply method of the invention in the case of a high speed of the aircraft turboshaft engine 6, the distribution valve 20 is positioned so as to distribute E2 the fuel C in greater proportion Q21 in the primary circuit 21 and in smaller proportion Q22 in the secondary circuit 22. All the nozzles 12, 15, 18 then inject E3 fuel C into the combustion chamber 5. In other words, the pressure in primary circuit 21 and secondary circuit 22 is higher than the predetermined cracking pressure T14 of the main valve 14, and therefore that of the pilot valves 11, 17. Furthermore, the injection step E3 is mainly implemented by the main nozzle 15 having greater permeability P15.

Figure 6A:
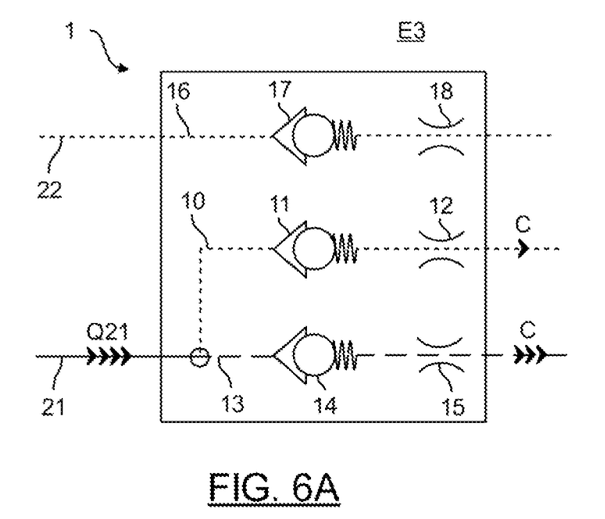
FIG. 6A and FIG. 6B are two schematic representations of the step of injecting fuel into a process injector of FIG. 4, in two cases of control and/or distribution step failure.
Figure 6B:
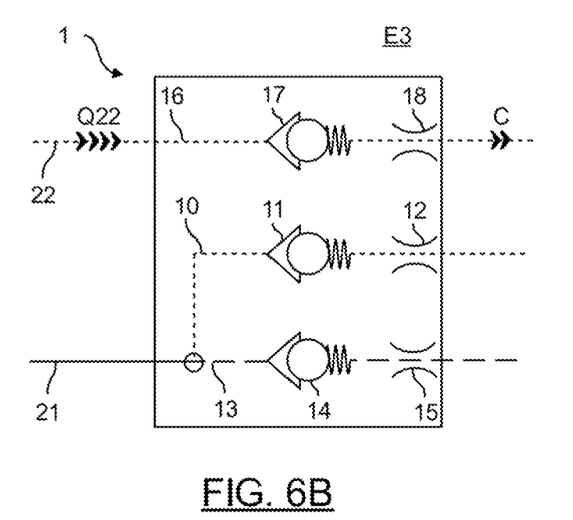

Advantageously, the supply method thus makes it possible to optimize supply to the combustion chamber 5 according to the engine speed of the aircraft turboshaft engine 6, by moving the distribution valve 20 and by making use of the differences in cracking pressure T11, T14, T17 of the valves 11, 14, 17 and permeability P12, P15, P18 of the nozzles 12, 15, 18 associated in each injector 1. Furthermore, as illustrated in FIGS. 6A and 6B, in the event of failure during the control step E1 and/or during the distribution step E2, an acceptable degraded mode is guaranteed as each circuit 21, 22 is connected to a pilot stage 10, 16. Indeed, in the example of FIG. 6A where the entire fuel flow rate Q21 is guided into the primary circuit 21, the fuel C is injected by the first pilot nozzle 12 and the main nozzle 15, which results in a low loss of thrust. In the opposite example of FIG. 6B where the entire fuel flow rate Q22 is guided into the secondary circuit 22, the fuel C is injected only by the second pilot nozzle 18, having greater permeability P18 than the first pilot nozzle 12, which results in a reduced loss of thrust.

Figure 7:
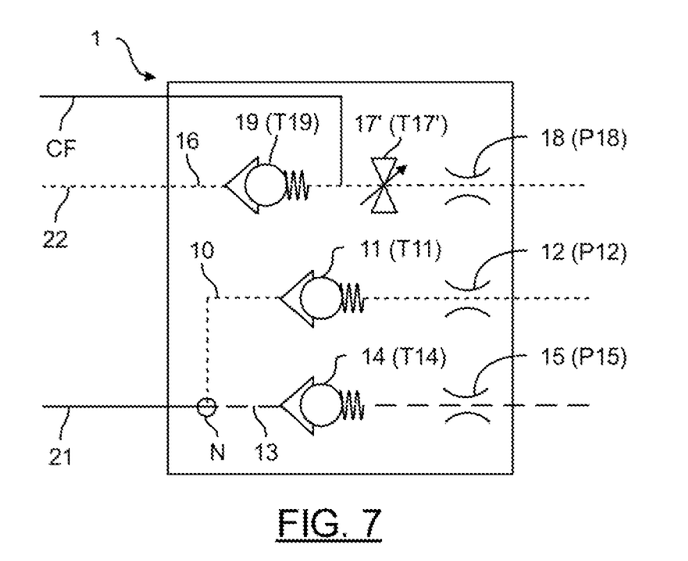
FIG. 7 is a schematic representation of an injector according to an alternative embodiment of the invention.

FIG. 7 illustrates an alternative embodiment of the invention differing from the previous one in that the second pilot valve 17' is a metering valve and the pilot stage 16 also comprises a seal valve 19 and an anti-coking conduit CF. As illustrated in FIG. 7, the second pilot valve 17' is positioned downstream of the seal valve 19 in order to supply the second pilot nozzle 18. The second pilot valve 17', that is the metering valve has a cracking pressure T17' greater than a cracking pressure T19 of the seal valve 19. The anti-coking conduit CF is in the form of a leakage conduit and opens, on the one hand, into the second pilot stage 16 between the second pilot valve 17 and the auxiliary valve 19, and, on the other hand, upstream of the supply system S. Advantageously, the seal valve 19 and the first pilot valve 11 may have substantially equal cracking pressures T11, T19, namely low, which allows fuel C to circulate in the second pilot stage 16 even at low speeds of the aircraft turboshaft engine 6. The anti-coking conduit CF in turn allows controlled leakage of fuel C from the second pilot stage 16 when the pressure in the fuel circuit 14 is greater than that of cracking pressure T19 of the seal valve 19 but less than that of cracking pressure T17' of the second pilot valve 17'. In other words, when the seal valve 19 is open but the second pilot valve 17' is closed, fuel C circulates via the anti-coking conduit CF. The controlled circulation of fuel C within the seal valve 19, while the second pilot valve 17' is closed, makes it possible to cool the seal valve 19 and thus to avoid coking of the fuel C.

The invention claimed is:

1. A supply system with fuel for a combustion chamber in an aircraft turboshaft engine, said supply system comprising:
    a plurality of injectors configured to inject the fuel into the combustion chamber, each of the injectors being a three-stage injector comprising a first pilot stage, a second pilot stage, and a main stage, the first pilot stage and the second pilot stage, respectively, comprising a first pilot valve and a second pilot valve each configured to circulate a permanent flow rate of the fuel, the main stage comprising a main valve configured to circulate an intermittent flow rate of the fuel, so as to adapt supply to the combustion chamber according to a speed of the aircraft turboshaft engine,
    a distribution device for distributing the fuel in the injectors being a dual-circuit distribution device comprising a primary circuit and a secondary circuit, the primary circuit being connected to the first pilot stage and the main stage, the secondary circuit being connected to the second pilot stage, the distribution device comprising a distribution valve configured to distribute the fuel between the primary circuit and the secondary circuit, and
    a control member for controlling the distribution valve according to the speed of the aircraft turboshaft engine.

2. The supply system according to claim 1, wherein the first pilot stage, the second pilot stage and the main stage, respectively, comprise a first pilot nozzle supplied by the first pilot valve, a second pilot nozzle supplied by the second pilot valve, and a main nozzle supplied by the main valve.

3. The supply system according to claim 2, wherein the first pilot nozzle is an aerodynamic injection type and configured to inject a spray of the fuel into the combustion chamber.

4. The supply system according to claim 2, wherein the second pilot nozzle is an aeromechanical injection type and configured to inject the spray of the fuel into the combustion chamber.

5. The supply system according to claim 2, wherein the main nozzle is a multipoint nozzle comprising a plurality of injection points.

6. The supply system according to claim 1, wherein the first pilot valve is a seal valve.

7. The supply system according to claim 1, wherein the main valve has a cracking pressure greater than a cracking pressure of the first valve, so as to deliver a flow rate of the fuel only above a predetermined pressure in the main stage.

8. The supply system according to claim 1, wherein the first pilot valve comprises a cracking pressure substantially equal to a cracking pressure of the second pilot valve.

9. The supply system according to claim 1, wherein the second pilot valve is a metering valve and the second pilot stage comprises a seal valve.

10. The supply system of claim 9, wherein the second pilot stage comprises an anti-coking conduit opening on a hand between the second pilot valve and the seal valve and on another hand upstream of the supply system, so as to allow the fuel to circulate via the seal valve when the second pilot valve is closed.

11. An aircraft turboshaft engine comprising a combustion chamber and a supply system according to claim 1, the injectors of the supply system opening into the combustion chamber so as to supply it with the fuel.

12. A method for supplying a combustion chamber in an aircraft turboshaft engine with fuel by means of the supply system of claim 1, the method comprising:
    controlling the distribution valve according to the speed of the aircraft turboshaft engine, by means of the control member,
    distributing the fuel between the primary circuit and the secondary circuit, by means of the distribution valve, and
    injecting the fuel into the combustion chamber, by means of the injectors,
    wherein at any speed of the aircraft turboshaft engine, once the turboshaft engine is started, the distribution valve guides the fuel into both the primary circuit and the secondary circuit during the distributing step.

13. The supply system according to claim 2, wherein the second pilot nozzle has a permeability greater than a permeability of the first pilot nozzle, and wherein the second pilot nozzle has a permeability less than a permeability of the main nozzle.

14. The supply system according to claim 2, wherein said first pilot nozzle is positioned in a center of each injector.

15. The supply system according to claim 2, wherein said second pilot nozzle is positioned peripherally in each injector.

16. The supply system according to claim 2, wherein said second pilot nozzle is positioned around the first pilot nozzle.

17. The supply system according to claim 2, wherein said injection points are positioned peripherally in each injector, and wherein said injection points are positioned around the first pilot nozzle.

18. The supply system according to claim 1, wherein the first pilot valve is free of a metering function.

19. The supply system according to claim 1, wherein said second pilot valve being positioned downstream of the seal valve.

20. The supply system according to claim 1, wherein said second pilot valve comprises a cracking pressure greater than a cracking pressure of the seal valve.

* * * * *